(12) United States Patent
Smyk

(10) Patent No.: US 6,603,760 B1
(45) Date of Patent: Aug. 5, 2003

(54) SYSTEM AND METHOD FOR GRADUAL TRANSITION OF LOCAL PHONE SERVICES FROM PSTN TO NEXT GENERATION NETWORK

(75) Inventor: Darek A. Smyk, Basking Ridge, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/455,611

(22) Filed: Dec. 7, 1999

Related U.S. Application Data
(60) Provisional application No. 60/111,505, filed on Dec. 8, 1998.

(51) Int. Cl.[7] .......................... H04L 12/66; H04L 12/28
(52) U.S. Cl. ........................ 370/352; 370/392; 370/400
(58) Field of Search ............................. 370/351–356, 370/400–402, 389–392, 252, 254, 395.2

(56) References Cited

U.S. PATENT DOCUMENTS

| | | | | |
|---|---|---|---|---|
| 5,115,431 A | * | 5/1992 | Williams et al. | 370/394 |
| 5,610,910 A | | 3/1997 | Focsaneanu et al. | 370/351 |
| H1641 H | | 4/1997 | Sharman | 379/60 |
| 5,822,420 A | | 10/1998 | Bolon et al. | 379/230 |
| 5,995,606 A | * | 11/1999 | Civanlar et al. | 379/207.13 |
| 6,011,844 A | | 1/2000 | Uppaluru et al. | 379/220 |
| 6,229,810 B1 | * | 5/2001 | Gerszberg et al. | 370/401 |

* cited by examiner

Primary Examiner—Steven Nguyen
Assistant Examiner—Michael J Molinari
(74) Attorney, Agent, or Firm—Joseph Giordano

(57) ABSTRACT

For any telephone service subscriber, local services could be offered based on either the packet switched next generation network (NGN) or the PSTN network. The network can be configured such that for each particular phone line, the line's services are based either on a PSTN's class 5 switch or on a NGN's service manager (SM). The local service provider, through software reconfiguration could quickly and efficiently move service subscribers' phone lines from class 5 switch based local services to SM based services, and vice-versa. If a call origination is attempted from a phone connected to an access gateway, the SM will instruct the network to handle the call differently depending on whether the services should be offered based on the class 5 switch or the SM. If the services ought to be offered through the class 5 switch, then the SM will establish a virtual local loop connection between the phone and the class 5 switch. Subsequently, the class 5 switch will provide the dial tone, collect the dialed digits and proceed with establishing the call. The NGN simulates a traditional local loop. If the local services are offered for the customer through the SM, the SM will fully control the call establishment and route the call bypassing the class 5 switch.

6 Claims, 4 Drawing Sheets

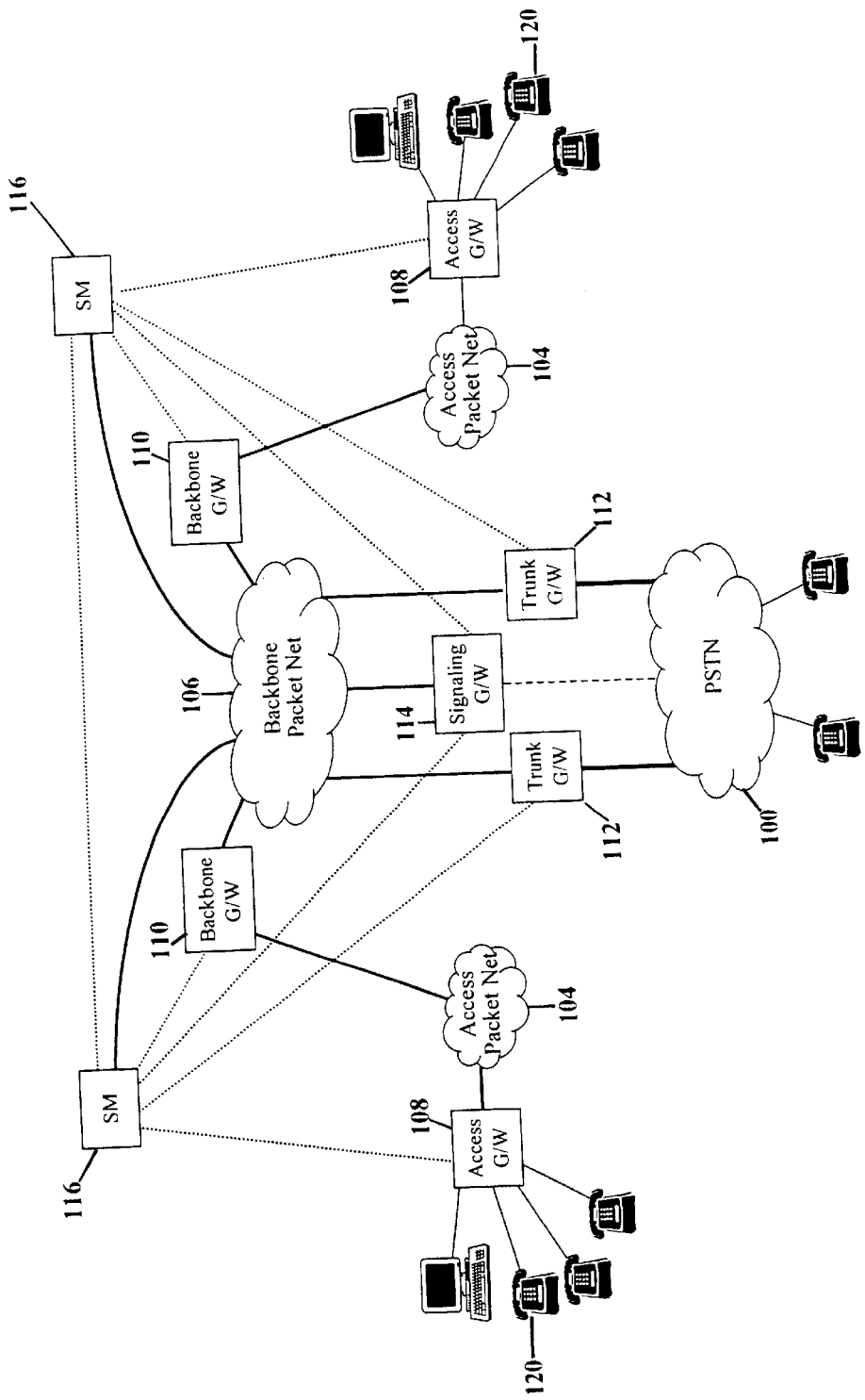
Figure 1: Prior Art

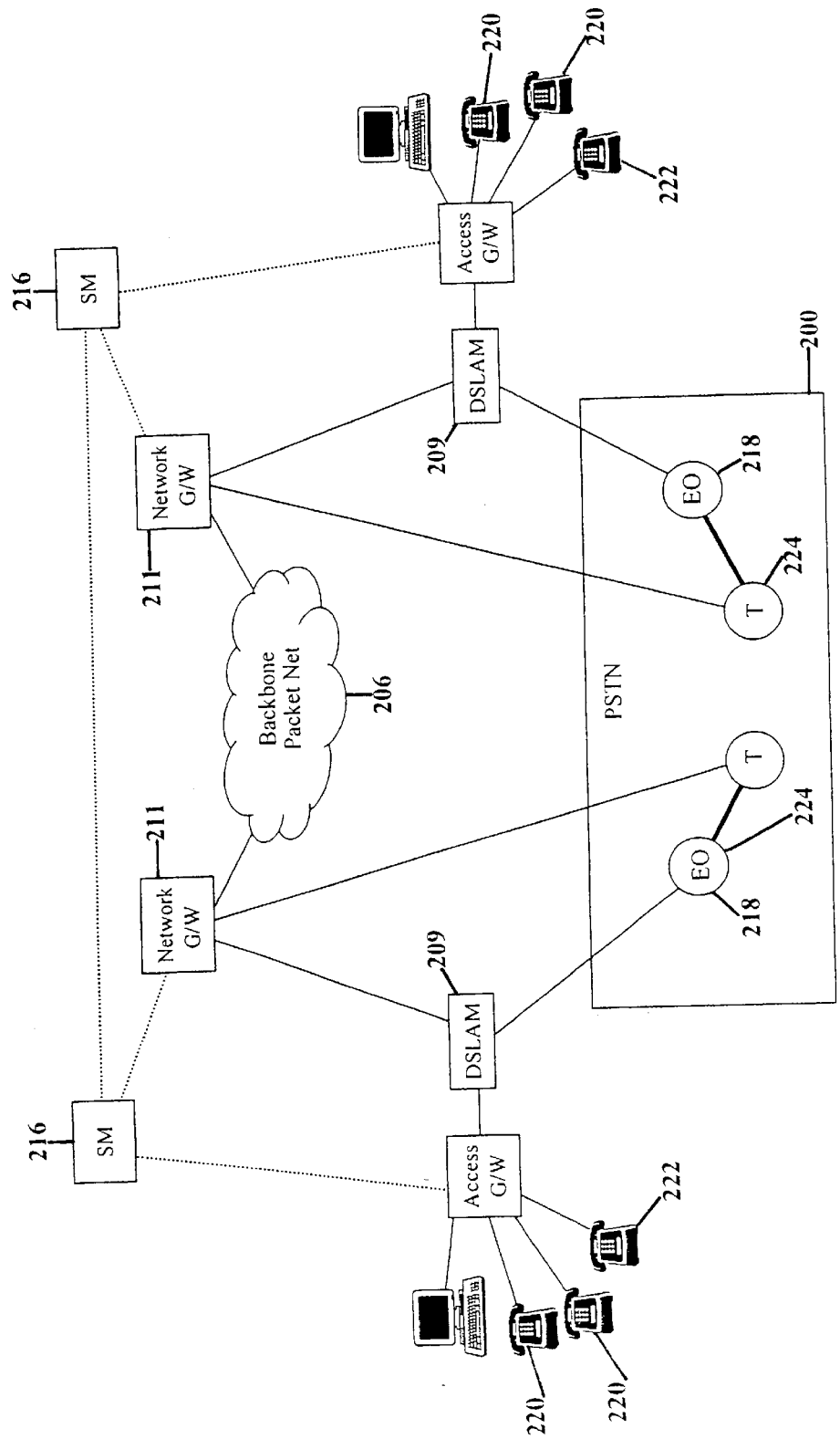
Figure 2: Prior Art

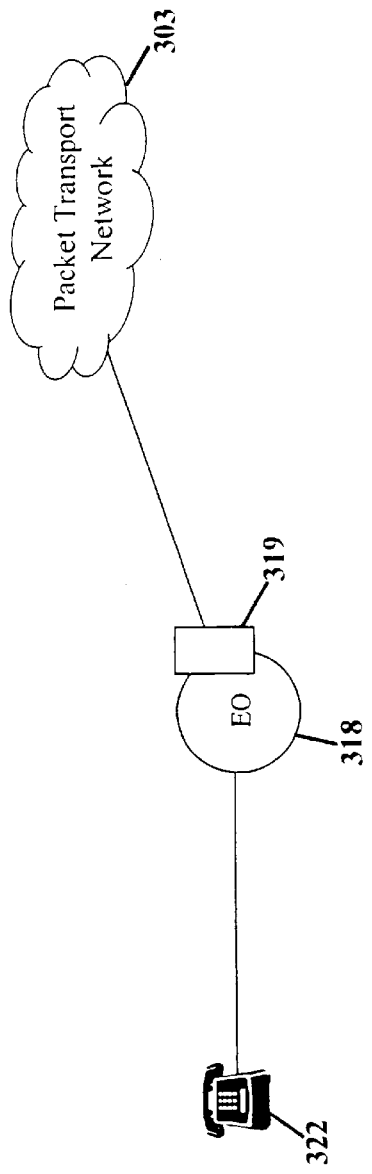
Figure 3a: Prior Art
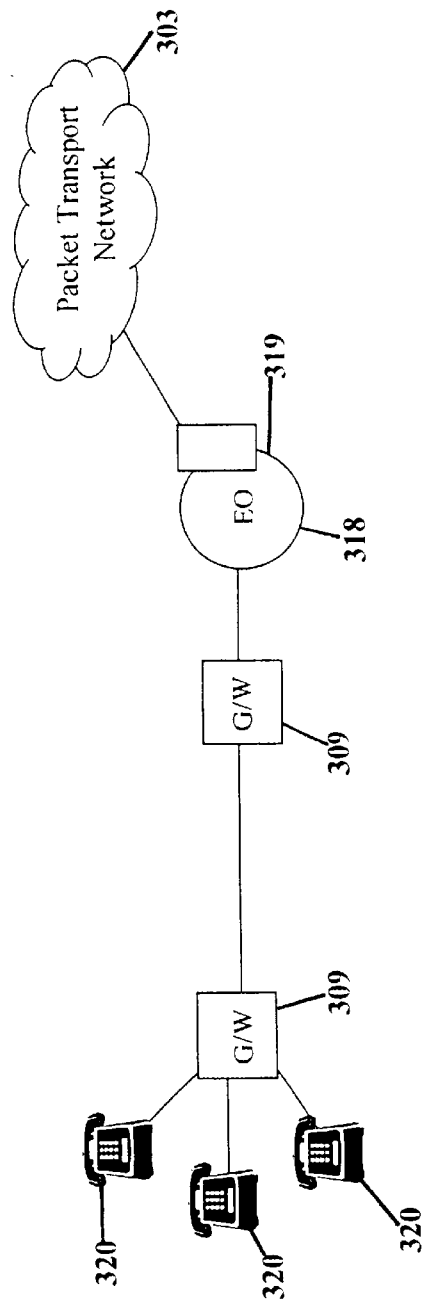
Figure 3b: Prior Art

SYSTEM AND METHOD FOR GRADUAL TRANSITION OF LOCAL PHONE SERVICES FROM PSTN TO NEXT GENERATION NETWORK

CROSS-REFERENCE TO RELATED APPLICATION

This application claims the benefit of U.S. Provisional Application No. 60/111,505, filed Dec. 8, 1998.

FIELD OF THE INVENTION

This invention relates to the provision of local telephone services.

BACKGROUND

The telecommunications industry is currently undergoing a transformation from a traditional circuit switched based PSTN network, which was originally designed and optimized for carrying voice telephony traffic, to packet based networks which will be capable of efficiently supporting both voice and data communications. A next generation network (NGN) is a packet-based network that employs new control, management, and signaling techniques to provide both narrow-band voice telephony services and broadband, multimedia services. NGNs are able to satisfy a user's need for higher bandwidth while allowing service providers to offer innovative services, enabling new services and revenue streams, and reducing management costs and time to market.

A generalized local service provider NGN architecture is shown in FIG. 1. It consists of two subnetworks, a public switched telephone network (PSTN) and an integrated voice and data packet network, which comprises access network 104 and a backbone network 106. The access packet network 104 physically connects subscribers 120 to the local service provider network. In the case of residential customers, the access network 104 will typically be based on digital subscriber loop (xDSL) technology deployed in the local loop or MSCNS DOCSIS technology deployed over coax cable. On the customer side, the access network terminates on the customer premises device, which is called here the access gateway 108. The particular implementation of an access gateway depends on the technology utilized in the access network. For access networks utilizing xDSL technology, the access network 108 may include an xDSL modem. For a hybrid fiber-coax based access, the access gateway 108 may be merged with set top boxes traditionally utilized for receiving TV signals broadcasted from cable-based distribution plants. Traditional telephone sets are either directly connected to the access gateway 108 or they are connected via a more elaborate home area network.

The packet based backbone network 106 is optimized for efficiently transmitting large amounts of data and typically utilizes IP, ATM and/or SONET technologies. For example, in the initial network deployment stages, the access and backbone networks could utilize ATM technology. However, since ATM switched virtual circuit (SVC) technology is not mature and ubiquitous enough to deploy end-to-end in the packet network, private virtual circuits (PVCs) are used in the access network and, frequently, in the backbone network.

The access network 104 is connected to the backbone network 106 via backbone gateways 110, which bridge transport technologies utilized in the two networks. For example, in the case of a xDSL based access network the backbone gateway 110 includes digital subscriber loop access multiplexer (DSLAM) functionality. Calls spanning the packet network and PSTN network, such as calls originating from access gateways 108 and terminating on the PSTN or vice versa, are routed through trunking gateways 112. A signaling gateway 114 is responsible for receiving signaling information from the PSTN (e.g., signaling system 7 packets) and routing that information to the appropriate network elements in the NGN. The signaling gateway can be a separate component or can be integrated into a service manager (SM) 116.

The NGN has its own control infrastructure. Typically, network elements are designated to support service, session and connection signaling. In this document, these elements are called service managers (SMs) but depending on the protocols involved, these elements are also called media gateway controllers, call agents, gatekeepers, and signaling agents.

Local service providers have started the transition of their networks from the traditional PSTN infrastructure to an NGN architecture to offer both local and long distance services. The challenge for the NGN network equipment vendors will be to support graceful transition of the current local service subscribers to the new infrastructure.

A serious limitation of the NGN architecture of FIG. 1 is that it does not support graceful migration of local services from the existing circuit switched infrastructure to the NGN network. In this architecture, the NGN network must provide all local services for phones utilizing packetized voice in the local loop. In addition, once a particular line is provisioned to receive local services from NGN, there is no easy and inexpensive way of re-provisioning the line to utilize PSTN local services.

Furthermore implementing within the NGN network all of the local services that are currently available in the PSTN is not a trivial task. Class 5 switches providing local PSTN services have been evolving for decades and by some estimates currently support over 500 different local service features. It is not reasonable to expect that all these features will be totally replicated in the new NGN infrastructure within a short timeframe. However, if NGN supports only a small subset of the local features then the deployment of the NGN may be limited to a small number of very specific target customers. Success of the NGN deployment will then depend on the reliability of the prognosis that can be made for defining a limited set of features to satisfy the needs of targeted customers until the NGN network matures. These deployment limitations could hamper the growth of the NGN network.

Prior techniques to address the migration of PSTN to NGN have certain limitations. FIG. 2 illustrates a specific implementation of the general NGN architecture depicted in FIG. 1. In this xDSL-based architecture, local service features for some telephones 222 are implemented by a class 5 end office switch 218. For other telephones 220, local service features are implemented based on the NGN service control infrastructure (i.e. based on the SM 216 network component).

For each set of telephone lines multiplexed over a single xDSL equipped local loop, the phone 222 utilizing analog transmission uses the bottom 4 kHz of the frequency spectrum of the access loop. The media stream for this line is separated in the DSLAM 209 and connected to the line side of the class 5 switch 218 which is connected to a tandem switch 224 in the PSTN 200. For the remaining phones 220, voice communication is implemented by transmitting packetized voice stream over the upper portion of the frequency spectrum. The packetized voice stream is routed via the DSLAM 209 and the network gateways 211 which are connected to the backbone packet network 206. The SM 216 controls local service features for telephones utilizing packetized voice.

While a limited number of lines are able to access local services provided by a class 5 switch in this architecture, these lines are unable to access any innovative features provided by the NGN. In addition, no easy or cost effective way exists to re-provision a line for a packetized voice customer who wishes to utilize services offered only on a class 5 switch.

FIG. 3a illustrates a network architecture that provides users access to class 5 switch features and an NGN architecture for transport. Phones 322 use traditional local loop facilities to connect to a class 5 switch 318. In this architecture, the class 5 switch 318 connects to an NGN network 303 via a packet data interface 319 located at the switch 318. While this architecture provides a service provider with access to some of the bandwidth and cost reduction benefits of the NGN, customers are not able to access innovative features offered by the NGN.

This architecture is sometimes modified to include packetized local loops as illustrated FIG. 3b. Virtual phones 320 use packetized local loop facilities (e.g., DSL) to connect to a local loop gateway 309. The packetized local loop network communicates with a class 5 switch 318 using traditional local loop signaling (e.g., channel associated signaling) through a local loop gateway 309. In this architecture, the class 5 switch 318 connects to an NGN network 303 via a packet data interface 319 located at the switch 318. This architecture has the benefit of providing multiple virtual phone lines over a single physical line. However, customers are not able to access the innovative features offered by the NGN.

An objective of my invention is to provide a network architecture that will allow local service providers to gracefully migrate local service features to the NGN network. This will include providing ability to efficiently switch local lines from the NGN to PSTN local service infrastructures and vice-versa.

It is yet another objective of my invention to enable supporting network infrastructure transparency to service subscribers and to reduce the local service provider's risk associated with abruptly replacing one network infrastructure with another.

SUMMARY

My invention is directed to a system which allows providers of packet based networks such as NGNs to offer customers the choice of local services provided by switches in the PSTN or services provided by an SM in the NGN. In a specific embodiment of my invention, the system includes an access gateway providing analog or digital access to the NGN, an SM identifying selected mode of operation for the customer and providing control of local services offered by the NGN, a subscriber database storing customer service preferences, a network gateway providing an interface between the NGN and the PSTN, a class 5 end office including digital loop carrier support, and PSTN access tandem switches. The system can operate in two separate modes simultaneously.

In the first mode of operation, the NGN simulates a digital local loop to allow local services to be offered to NGN customers by class 5 switching systems. In this mode, the NGN is transparent to both the customer and the class 5 switching system. This mode of operation is referred to herein as virtual local loop (VLL) mode. In this mode, the SM is notified of a call origination or call termination event. The SM accesses the subscriber database to determine whether the customer subscribes to services offered through the NGN or through the class 5 switch. If the customer subscribes to services offered through the class 5 switch, the packet based network under control of the SM establishes a connection between the network customer and the network gateway through an access gateway. A connection is also established between the network gateway and the class 5 switch. After these connections are established, local loop supervision information is signaled between the packet based network and the class 5 switch using digital loop carrier channel associated signaling. The customer is then connected via the virtual local loop to the class 5 end office which acts as an originating end office for the customer's line.

Alternatively, the VLL mode of operation could be implemented in another manner. In this implementation, the local loop supervision information is signaled via a combination of channel associated signaling and out-of-band signaling. In this mode, the loop supervision signaling between the class 5 switch and network gateway is via channel associated signaling. The signaling between the network gateway and the SM and between the SM and access gateway is via out-of-band signaling. In this mode, the network gateway translates the channel associated signaling into out-of-band signaling messages.

In a second mode of operation, the NGN simulates a local loop to allow local services to be offered to NGN customers through the SM in the NGN. In this embodiment, the NGN is transparent to the customer. This mode of operation is referred to herein as native NGN mode.

The access gateway is continually monitoring to detect a call origination event on a customer's line. When a call event is detected for the customer's line, the access gateway sends a message reporting the event to the SM.

Based on the information in the subscription database, the SM determines that the customer has selected service features offered through the SM and the call should be established in native NGN mode. In native NGN mode, the SM sends a message to the access gateway requesting that the gateway provide dial tone and collect the dialed digits according to the dialed plan specified in the message. The access gateway provides a dial tone, collects the dialed digits and reports the dialed number to the SM and the SM immediately acknowledges that notification. The call to the dialed number is then established.

BRIEF DESCRIPTION OF DRAWINGS

FIG. 1 is a network diagram illustrating a general network deployment of a next generation network.

FIG. 2 is a network diagram illustrating a specific implementation of a next generation network.

FIG. 3 is a network diagram illustrating a method of providing local services via the PSTN and transport service via a packet based network.

DESCRIPTION

Figure 4:
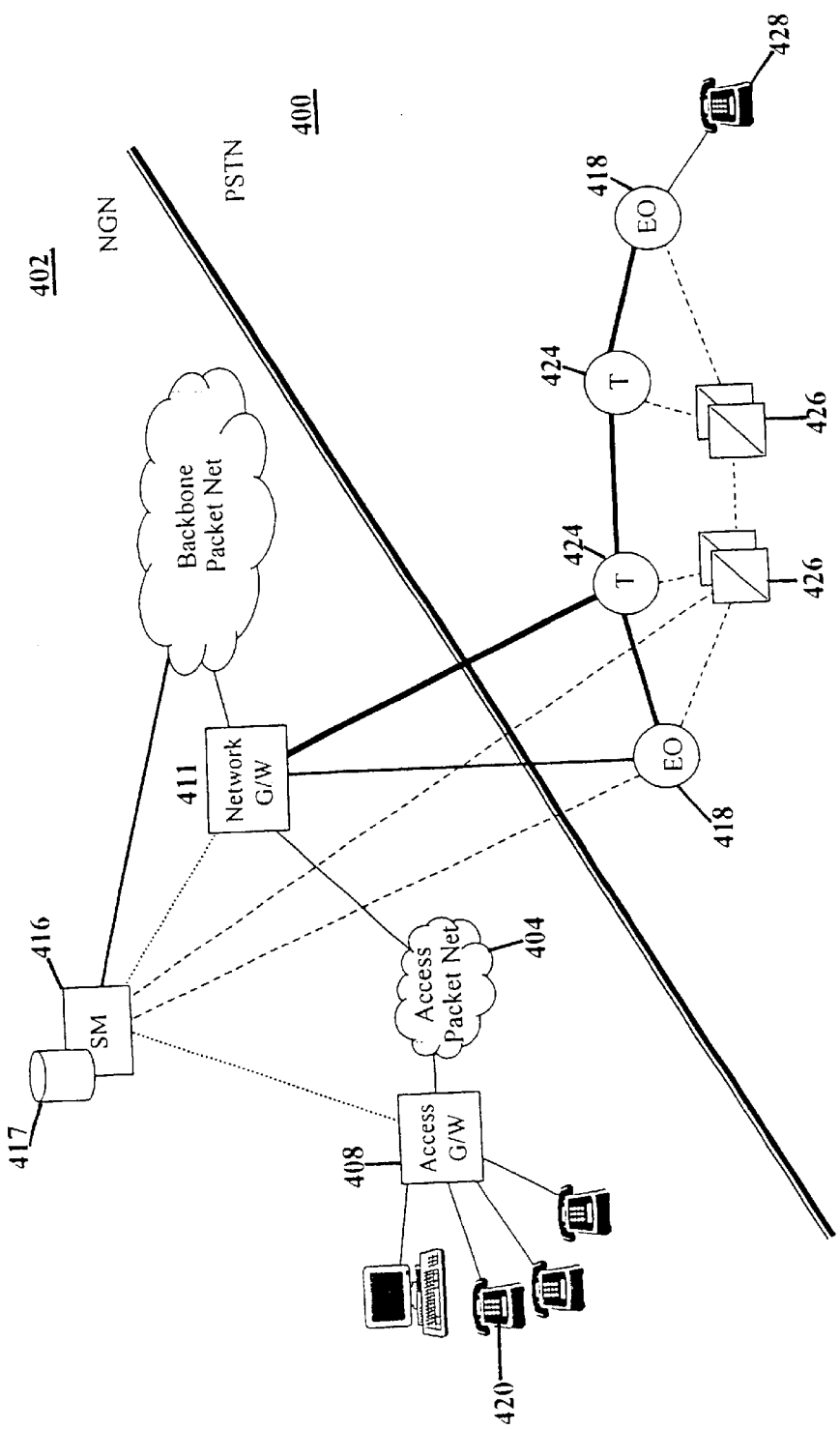
FIG. 4 is a functional network diagram according to the present invention.

FIG. 4 illustrates a system according to a specific illustrative embodiment of my invention. In this architecture, for any telephone service subscriber 420, local services could be offered based on either the packet switched NGN 402 or the PSTN network 400. The network can be configured such that for each particular virtual phone line, the line's services are either based on a PSTN's class 5 switch 418 or on a NGN's SM 416. The local service provider, through software reconfiguration, could quickly and efficiently move service subscribers' virtual phone lines from class 5 switch based local services to SM based services, and vice-versa. The system can operate in two separate modes simultaneously.

In the present invention, the SM 416 controls whether the local services are offered through the SM or through the class 5 switch 418. For example, if a call origination is attempted from a phone 420 connected to an access gateway 408, the SM 416 will instruct the network to handle the call differently depending on whether the services should be offered based on the class 5 switch or the SM. If the services ought to be offered through the class 5 switch, then the SM 416 will establish a connection between the phone 420 and the class 5 switch 418. Subsequently, the class 5 switch 418 will provide the dial tone, collect the dialed digits and proceed with establishing the call. The NGN in accordance with an aspect of my invention simulates a traditional local loop. However, if the local services ought to be offered through the SM, the SM 416 will fully control the call establishment and route the call bypassing the class 5 switch 418.

In a first mode of operation of my invention depicted in FIG. 4, the NGN 402 thus simulates a local loop to allow local services to be offered to NGN customers by class 5 switching systems. In this mode, the NGN is transparent to both the customer and the class 5 switching system. This mode of operation is referred to herein as virtual local loop (VLL) mode.

The access gateway 408 is continually monitoring to detect a call origination event on a customer's line 420. In this mode of operation, a call originating from an NGN customer can be delivered to an off-network party, as described below. When an off-hook event is detected by the access gateway 408, the access gateway sends a message reporting the event to the SM 416. The SM 416 immediately sends an acknowledgement message back to the access gateway 408. In a preferred embodiment of the invention, the signaling between the access gateway and the SM is media gateway control protocol (MGCP) or its successor (i.e., H.248).

A subscription database 417 contains information related to the customer's line such as whether the customer subscribes to communications services offered through the SM or through the class 5 switch. The subscription database 417, accessible by the SM, may be resident on the SM or may be located on another platform within the NGN or external to the NGN.

Based on the information in the subscription database 417, the SM 416 determines that the customer has selected service features offered through the class 5 switch 418 and the call should be established in VLL mode. The subscription database may also contain information indicating that the customer has selected service features offered by the NGN. This mode of operation is referred to herein as native NGN mode. Native NGN mode is described in detail below.

The SM 416 sends a message to the access gateway 408 requesting the gateway to seize a connection to the network gateway 411. If ATM is deployed in the access network 404, the access gateway 408 will seize a private virtual circuit (PVC) channel. A network provider may also choose to deploy IP in the access network. Within the same message, the SM 416 requests that the access gateway 408 monitor for an on-hook transition by the customer.

The access gateway 408 seizes a connection to the network gateway 411 and connects it to the endpoint originating the call. The access gateway then sends an acknowledgment message back to the SM 416 including the session description, used to describe the audio properties for the connection. The session description information includes the address at which the access gateway 408 is ready to receive audio data.

The SM 416 sends a set-up message using channel associated signaling to the line termination side of the class 5 switch 418 through the network gateway 411. The channel associated signaling used between the SM and the class 5 switch is based on the signaling described in GR-303, *Integrated Digital Loop Carrier System Generic Requirements, Objectives, and Interface* (Telcordia Technologies, 1998). By using traditional local loop signaling, the NGN simulates a local loop and its involvement in the call is transparent to the class 5 switch. The set-up message from the SM 416 requests that the class 5 switch 418 begin assignment of the time slot on the time multiplexed bearer channel between the network gateway 411 and the switch 418. The call reference information element of the setup message identifies the telephone line originating the call setup.

The class 5 switch 418 signals to the network gateway 411 the assigned time slot for the call and that the time slot is connected to the appropriate line unit of the class 5 switch 418. The channel identification element of the message to the network gateway identifies which DSO (time slot) to use for the originating call. In addition, the network gateway 411 forwards the message to SM 416.

The SM 416 sends a message to the network gateway 411 requesting that the network gateway cross connect the DSO (time slot) identified by the class 5 switch and the connection chosen by the access gateway 408. The network gateway 411 acknowledges this request in a message to the SM 416.

The SM 416 sends signals to the class 5 switch 418 that the appropriate bearer circuit was connected to the timeslot and that the line equipment will be inserting and reacting to ABCD codes provided in the channel associated signaling. The SM 416 also signals to the network gateway 411 requesting that the gateway start inserting off-hook ABCD signaling bits. The network gateway 411 sends an acknowledgment message for this request to the SM 416 and starts inserting off-hook ABCD signaling bits.

The class 5 switch 418 and the access gateway 408 proceed in establishment of the call without any further involvement from the SM 416. At this point, the call proceeds as a normal PSTN call using services offered through the class 5 switch such as traditional telephony services, AIN services, and, if required, a tandem switch 424. The class 5 switch will provide dial tone to the customer 420 and collect dialed digits. The call is routed to the terminating party 428 using traditional PSTN signaling and transmission capabilities.

Upon detection of an on-hook event (i.e., off-network or terminating party hangs up) by the PSTN, the originating class 5 switch sends a disconnect message to the SM 416. The message signals to the SM to begin clearing the timeslot assignment. The SM 416 sends a delete connection message to the access gateway 408. At the same time, the SM 416 also requests that the access gateway 408 monitor for subsequent call originations from the line. The access gateway responds to the delete connection message with an acknowledgment including terminating call parameters.

The SM 416 next signals the network gateway 411 to delete the cross connect between the DS0 (time slot) and the connection established by the access gateway 408. The network gateway responds to the message from the SM with an acknowledgment message.

The SM 416 sends a release message to the class 5 switch 418 through the network gateway 411. The class 5 switch 418 sends a release complete message to the SM 416 indicating that the call termination procedure was fully completed.

In the embodiment of my invention depicted in FIG. 4, a call from an off-network party can also be delivered in VLL mode to an NGN customer 420. A call from an off-network provider terminates on a class 5 switch 418. This method of termination provides NGN customers access to terminating switched-based features (e.g., call forwarding) and intelligent network features. The class 5 switch 418 sends a set-up message over the line-side connection to the SM 416 when a call is placed to an NGN service subscriber 420. The set-up message includes a channel identification element, which specifies the DS0 (time slot) to be used for the call.

Based on the information in the subscription database, the SM 416 confirms that the call to the called party ought to be established in VLL mode. It sends a message to the access gateway 408 requesting that the gateway create a connection to the network gateway 411. Within this same message, the SM 416 request that the access gateway monitor for an on-hook transition.

The access gateway 408 seizes a connection to the network gateway 411 and connects it to the endpoint originating the call. The access gateway then sends an acknowledgment message back to the SM 416 including the session description, used to describe the audio properties for the connection. The session description information includes the address at which the access gateway 408 is ready to receive audio data.

The SM 416 sends a message to the network gateway 411 requesting that the network gateway cross connect the DS0 (time slot) identified by the class 5 switch and the connection chosen by the access gateway 408. The network gateway 411 acknowledges this request in a message to the SM 416.

The SM 416 sends signals to the class 5 switch 418 that the appropriate bearer circuit was connected to the timeslot and that the line equipment will be inserting and reacting to ABCD codes provided in the channel associated signaling. The message also include channel identification information so that the class 5 switch can verify that the SM has used the correct DS0 (time slot) for the incoming call. The SM 416 also signals to the network gateway 411 requesting that the gateway start inserting on-hook ABCD signaling bits. The network gateway 411 sends an acknowledgment message for this request to the SM 416 and starts inserting on-hook ABCD signaling bits.

The class 5 office 418 then starts inserting ringing ABCD signaling bits. In response, the network gateway 411 sends a message to the SM 416 reporting the ringing signaling bit. The SM 416 sends an acknowledgment message to the network gateway 411.

The SM 416 sends a message to the access gateway requesting that the gateway start ringing the phone 420 and monitoring for off-hook event and the access gateway sends an acknowledgment message to the SM 416. When the off-hook event is detected, the access gateway 408 reports the event to the SM 416 and the SM sends an acknowledgment message back to the access gateway.

The SM 416 signals to the network gateway 411 requesting that the gateway start inserting off-hook ABCD signaling bits. The network gateway 411 sends an acknowledgment message for this request to the SM 416 and starts inserting off-hook ABCD signaling bits.

The class 5 switch 418 starts inserting normal supervision ABCD signaling bits. The class 5 switch 418 and the access gateway 408 proceed in establishing the call without any further involvement from the SM 416.

In another mode of my invention the NGN 402 simulates a local loop to allow local services to be offered to NGN customers through the SM in the NGN. In this embodiment, the NGN is transparent to the customer. This mode of operation is referred to herein as native NGN mode.

The access gateway 408 is continually monitoring to detect a call origination event on a customer's line 420. In this mode of operation, a call originating from an NGN customer can be delivered to an off-network party served by a PSTN, as described below. When an off-hook event is detected by the access gateway 508, the access gateway sends a message reporting the event to the SM 416. The SM 416 immediately sends an acknowledgement message back to the access gateway 408. In a preferred embodiment of the invention, the signaling between the access gateway and the SM is MGCP or its successor (i.e., H.248).

Based on the information in the subscription database 417, the SM 416 determines that the customer has selected service features offered through the SM 416 and the call should be established in native NGN mode. The SM 416 sends a message to the access gateway 408 requesting that the gateway provide dial tone and collect the dialed digits according to the dialed plan specified in the message. Within this same message, the SM 416 requests that the gateway 408 monitor for an on-hook transition. The access gateway 408 immediately sends an acknowledgement message to the SM 416.

The access gateway provides a dial tone, collects the dialed digits and reports the dialed number to the SM and the SM immediately acknowledges that notification. The access gateway 408 seizes a connection to the network gateway 411 and connects it to the endpoint originating the call. The access gateway then sends an acknowledgment message back to the SM 416 including the session description, used to describe the audio properties for the connection. The session description information includes the address at which the access gateway 408 is ready to receive audio data. Based on the dialed number, the SM determines that the calls should be routed to the PSTN via the network gateway.

The SM 416 sends a message to the network gateway 411 requesting that the gateway seize the outgoing time division multiplexed (TDM) trunk to the trunk side of the access tandem 424. The message contains identification of connection to be used for bearer connection between the network gateway 411 and the access gateway 408. The network gateway 411 acknowledges the request by sending a message to the SM 416.

The SM next sends a signaling system 7 initial address message (IAM) to the PSTN switch via the common channel signaling (CCS) signaling transfer point (STP) 426. In a preferred embodiment, the NGN is connected to the access tandem in the PSTN through ISUP trunks for signaling. As the call progresses, the SM expects to receive an address complete message (ACM) via the STP 426. This flow assumes the half-duplex transmission path is used to provide ringing from the remote switch (in the PSTN) to the calling party 420. After the called party 428 goes off-hook, the SM will receive an answer message (ANM) from the PSTN switch 418 via the STP 426.

Upon receipt of the answer message, the SM 416 sends a message to the access gateway 408 requesting it to place the connection in full duplex mode. The access gateway 408 immediately acknowledges that request and the call is established.

When the calling party 420 goes on-hook, the access gateway 408 notifies the SM 416 and the SM acknowledges this notification. The SM 416 begins to tear down the call, releasing the facilities in parallel. As part of this procedure, the SM 416 sends a release message to the PSTN switch 418 via STP 426. The SM 416 also sends a message to the access gateway 408 instructing it to delete the connection and requesting notification of a subsequent off-hook event by the calling party. The acknowledgment message from the access gateway includes connection parameters. The SM 416 also instructs the network gateway 411 to release the TDM circuit connection and the network gateway acknowledges the request. The PSTN switch 418 also acknowledges the release message from the SM 416.

Alternatively, the VLL mode of operation could be implemented in another manner. In this implementation, channel associated signaling is translated to MGCP signaling at the network gateway 411. Instead of inserting channel associated signaling into the packet stream of data, the access gateway 408 reports channel associated signals to the SM 416 as MGCP events. These events would then be forwarded (tunneled) by the SM to the network gateway 411 via the MGCP protocol and converted by the network gateway to channel associated signals used in the signaling to the class 5 switch 418.

For this architecture two additional MGCP events have to be handled by the SM: Power Ring and Flash Hook. Since the SM only has to forward these signals to their destinations (the access gateway or network gateway depending on the signal direction), the additional computational load introduced by these messages is minimal. Adopting such a scheme has an additional advantage if the transport used for bearer channels is other than AAL 1 (common bit rate). In the case of AAL 2 with voice compression and silence elimination, sending channel associated signals in the stream of data may be difficult. By using MGCP to report these events, bearer channel properties are irrelevant from a signaling point of view.

Note that to accommodate this mode of operation, the call flow described in connection with FIG. 4 basically does not change (apart from the addition of the Power Ring MGCP message). The class 5 switch 418 will perform all computation intensive operations such as digit collection and call routing.

Although the invention has been shown and described with respect to exemplary embodiments thereof, it should be understood by those skilled in the art that various changes, omissions and additions may be made therein and thereto, without departing from the spirit and the scope of the invention.

I claim:

1. A method for using a packet based network as a telephone customer's local loop to provide to packet based customers the option alternatively to obtain communication services either from the packet based network or from an end central office, said method comprising the steps of:

notifying a service manager in the packet based network of a call event;

the service manager accessing a subscriber database to determine whether the packet based customer subscribes to communication services through the end central office or solely through the packet based network;

if the customer subscribes to service through the end central office establishing a connection between a network gateway in the packet based network and the central office whereby the packet based network can simulate a local loop, signaling local loop supervision information between the end central office and the packet based network, and establishing a call connection through the end central office and a called party; and if the customer subscribes to service through the packet based network only, providing dial tone and collecting digits at an access gateway associated with the packet based customer, and establishing a call connection between the packet based customer and a called party through the packet based network alone.

2. The method in accordance with claim 1, wherein said step of providing a call connection between the packet based customer and a called party through the packet based network alone includes sending a message including the dialed digits to the service manager from the access gateway.

3. The method in accordance with claim 1, further comprising, if the customer subscribes to service through the end central office, establishing a connection between the customer and the network gateway through the access gateway.

4. The method in accordance with claim 3 further comprising, if the customer subscribes to service through the end central office, signaling local loop supervision information between the central office and the packet based network.

5. The method in accordance with claim 4 wherein the step of signaling local loop supervision information between the central office and packet based network comprises the steps of:

transmitting local loop supervision information between the central office and the network gateway;

transmitting local loop supervision information between the network gateway and the service manager; and transmitting local loop supervision information between the service manager and the access gateway.

6. The method in accordance with claim 5 wherein said transmitting between the central office and the network gateway is via channel associated signaling, said method further comprising translating the channel associated signaling to out-of-band signaling in the network gateway.

\* \* \* \* \*